하지 않음

United States Patent
Mizrahi et al.

(10) Patent No.: US 8,964,742 B1
(45) Date of Patent: Feb. 24, 2015

(54) LINKED LIST PROFILING AND UPDATING

(75) Inventors: Tal Mizrahi, Haifa (IL); David Melman, D.N. Bikat Beit Hakerem (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 156 days.

(21) Appl. No.: 13/189,132

(22) Filed: Jul. 22, 2011

Related U.S. Application Data

(60) Provisional application No. 61/368,452, filed on Jul. 28, 2010.

(51) Int. Cl.
*H04L 12/28* (2006.01)

(52) U.S. Cl.
USPC ............ 370/390; 370/356; 370/365; 370/385

(58) Field of Classification Search
USPC .................................................. 370/351–390
See application file for complete search history.

(56) References Cited

U.S. PATENT DOCUMENTS

| | | | |
|---|---|---|---|
| 5,276,680 A * | 1/1994 | Messenger .................... | 370/311 |
| 6,049,526 A * | 4/2000 | Radhakrishnan et al. .... | 370/229 |
| 6,185,188 B1 | 2/2001 | Hasegawa | |
| 6,370,142 B1 * | 4/2002 | Pitcher et al. ................. | 370/390 |
| 6,442,141 B1 * | 8/2002 | Borella et al. ................ | 370/248 |
| 6,507,562 B1 * | 1/2003 | Kadansky et al. ............ | 370/216 |
| 6,859,835 B1 | 2/2005 | Hipp | |
| 6,985,956 B2 | 1/2006 | Luke et al. | |
| 7,224,668 B1 | 5/2007 | Smethurst et al. | |
| 7,467,191 B1 | 12/2008 | Wang et al. | |
| 7,574,202 B1 | 8/2009 | Tsao et al. | |
| 7,606,239 B2 | 10/2009 | Maveli et al. | |
| 7,796,594 B2 | 9/2010 | Melman et al. | |
| 7,969,880 B2 | 6/2011 | Yano et al. | |
| 8,077,730 B2 | 12/2011 | Maveli et al. | |
| 8,234,361 B2 | 7/2012 | Krywaniuk | |
| 8,238,340 B2 | 8/2012 | Mack-Crane et al. | |
| 8,320,255 B2 | 11/2012 | Vasseur et al. | |
| 2002/0049049 A1 * | 4/2002 | Sandahl et al. ............... | 455/414 |
| 2003/0120806 A1 * | 6/2003 | Clune et al. ................... | 709/238 |
| 2003/0212830 A1 | 11/2003 | Greenblat et al. | |
| 2004/0015599 A1 | 1/2004 | Trinh et al. | |
| 2004/0030765 A1 * | 2/2004 | Zilbershtein et al. ......... | 709/223 |
| 2004/0044744 A1 | 3/2004 | Grosner et al. | |
| 2004/0136371 A1 | 7/2004 | Muralidhar et al. | |
| 2004/0252722 A1 | 12/2004 | Wybenga et al. | |

(Continued)

FOREIGN PATENT DOCUMENTS

EP            1885139 A1      2/2008

OTHER PUBLICATIONS

U.S. Appl. No. 13/151,927, Uri Safrai, "Centralized Packet Processor for a Network," filed Jun. 2, 2011.

(Continued)

*Primary Examiner* — Alex Skripnikov
*Assistant Examiner* — Rasha Fayed

(57) ABSTRACT

Linked list profiling and updating techniques define subsets of linked list entries that are executed upon various resource calls. The subsets are defined by linked list profiles. The techniques can add/remove linked list entries to/from these profiles in a flexible update manner, in which a profile table is used to store profiles, or in atomic manner, in which each linked list entry itself contains profile data. Implemented in a communication system network device, the techniques are used to define and update profiles of physical or virtual ports used for packet-based egress and ingress communications.

20 Claims, 11 Drawing Sheets

(56) References Cited

U.S. PATENT DOCUMENTS

| | | | |
|---|---|---|---|
| 2005/0117571 A1* | 6/2005 | Dyke | 370/355 |
| 2005/0157741 A1* | 7/2005 | Wu et al. | 370/432 |
| 2005/0195816 A1* | 9/2005 | Sumiyoshi | 370/390 |
| 2005/0232303 A1 | 10/2005 | Deforche et al. | |
| 2006/0002386 A1 | 1/2006 | Yik et al. | |
| 2006/0168301 A1* | 7/2006 | Chang et al. | 709/231 |
| 2006/0230185 A1 | 10/2006 | Errickson et al. | |
| 2007/0104192 A1 | 5/2007 | Yoon et al. | |
| 2007/0121627 A1* | 5/2007 | Chen | 370/390 |
| 2007/0195761 A1* | 8/2007 | Tatar et al. | 370/389 |
| 2007/0266173 A1 | 11/2007 | Wong et al. | |
| 2008/0056122 A1 | 3/2008 | Madhi et al. | |
| 2008/0159277 A1 | 7/2008 | Vobbilisetty et al. | |
| 2008/0205403 A1 | 8/2008 | Akyol et al. | |
| 2008/0209278 A1* | 8/2008 | Barsness et al. | 714/38 |
| 2008/0225853 A1 | 9/2008 | Melman et al. | |
| 2008/0232253 A1 | 9/2008 | Wilt et al. | |
| 2008/0285555 A1 | 11/2008 | Ogasahara | |
| 2009/0083445 A1 | 3/2009 | Ganga | |
| 2009/0157846 A1 | 6/2009 | Shimozono et al. | |
| 2009/0296579 A1 | 12/2009 | Dharwadkar et al. | |
| 2010/0280943 A1* | 11/2010 | Zoldi et al. | 705/39 |
| 2010/0281437 A1 | 11/2010 | Stone-Perez et al. | |
| 2011/0007744 A1 | 1/2011 | Melman et al. | |
| 2011/0134925 A1* | 6/2011 | Safrai et al. | 370/395.53 |
| 2012/0060010 A1 | 3/2012 | Shimozono et al. | |
| 2012/0291117 A1 | 11/2012 | Krywaniuk | |

OTHER PUBLICATIONS

U.S Appl. No. 13/151,948, Uri Safrai, "Interface Mapping in a Centralized Packet Processor for a Network," filed Jun. 2, 2011.

U.S Appl. No. 12/938,116, Uri Safrai, "Switching Apparatus and Method Based on Virtual Interfaces," filed Nov. 2, 2010.

* cited by examiner

LINKED LIST PROFILING AND UPDATING

RELATED APPLICATION

This is a regular-filed application that claims the benefit of U.S. Provisional Patent Application No. 61/368,452, entitled "Linked List Profiles," which was filed on Jul. 28, 2010, the entire disclosure of which is hereby incorporated by reference herein.

FIELD OF TECHNOLOGY

The present disclosure relates generally to linked lists stored for use in a processing environment and, more particularly, to a system and method for profiling and updating linked lists in an effective manner.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A linked list is a data structure that includes a sequence of entries each of which contains a reference to another entry, typically another entry in a sequential manner. Linked lists are used in various computer and networking applications. In a switching device, for example, a linked list identifies resources, such as ports, at the physical layer, through which the data may be transmitted. At times one or more subsets of the full linked list need to be identified. Conventionally, different liked lists are created for the various different subsets of resources that are defined within a system.

In a network example, a full link list includes all of the active network ports in a particular network. A subset includes only some of the ports, such as, for example, ports that are associated with a particular group, for instance a division or a department within an organization, that may receive multicast transmissions. A particular multicast group may include ports that are exclusively in that multicast group. Alternatively, the particular multicast group may include ports that are also members in a different multicast group. In other examples, linked lists are provided for other resources, such as clients on a network, different software applications that are available for use, and the like.

SUMMARY

In an embodiment, a method for transmitting a multicast message over a network, including: accessing, in a network device, a profile defining a subset of entries in a linked list, where each entry in the linked list corresponds to a different network resource of the network device, and where each network resource is for communicating with a different user network device on the network; and transmitting the multicast message to only the network resources identified in the profile.

In another embodiment, a method of managing a multicast group of user network devices on a network, including: defining, in a network device, a linked list having a plurality of linked list entries corresponding to network resources of the network device and a plurality of profiles associated with the linked list entries, wherein at least one profile comprises a state bit for at least some of the plurality of the linked list entries, each state bit having (i) a first state indicating that the corresponding linked list entry is active and (ii) a second state indicating that the corresponding linked list entry is inactive, wherein each of the plurality of profiles contains a different combination of active linked list entries; and updating at least one of the plurality of profiles to add or remove a linked list entry by setting a state of at least one state bit.

In another embodiment, a network device for transmitting a multicast message over a network, including: a packet processor having, a linked list handler to access a profile defining a subset of entries in a linked list, where each entry in the linked list corresponds to a different network resource of the network device, and where each network resource is for communicating with a different user network device on the network, wherein the packet processor is to transmit the multicast message to only the network resources identified in the profile.

In yet another embodiment, a network device for managing a multicast group of user network devices on a network, includes: a packet processor having a linked list handler configured to define a linked list having a plurality of linked list entries corresponding to network resources of the network device and to define a plurality of profiles associated with the linked list entries, wherein at least one profile comprises a state bit for at least some of the plurality of the linked list entries, each state bit having (i) a first state indicating that the corresponding linked list entry is active and (ii) a second state indicating that the corresponding linked list entry is inactive, wherein each of the plurality of profiles contains a different combination of active linked list entries, where the linked list handler is to update at least one of the plurality of profiles to add or remove a linked list entry by setting a state of at least one state bit.

DETAILED DESCRIPTION

Generally, techniques described herein define various linked list configurations that allow for efficient addition of data elements to and deletion of data elements from the linked list, as well for efficient definition of subsets of data elements within the linked list. Systems and devices for implementing these techniques are also described. The described techniques provide a level of flexibility that is not available by merely manipulating linked lists. Implemented in an example communication network device, these techniques allow for data routing and switching between a large number of ports identified by a linked list, where each data element of the linked list defines a different port, e.g., at the physical layer, that is available on a given network served by the network device. With a large number of ports defined by a link list, using devices and techniques described herein, selected ports can be readily filtered to create one or more subgroups of ports that are associated, for example, with multicast groups.

In an embodiment, the network device establishes and maintains profiles of the linked list, where each profile represents a different subset of the ports, within a group of ports defined by a linked list, that may be accessed by a resource on the device. In a switching process, the network device uses these different profiles to identify different ports through which data is to be routed. For example, in an embodiment, the different profiles correspond respectively to ports that are members of different multicast groups served by the device. Multicast groups include ports that receive a particular multicast message, or a copy of the multicast message, that is sent in a single transmission from a source. There may be several multicast groups in a network. The linked list elements and profiles are updated in a manner that maintains data structure continuity across the accessing resources. In an embodiment, updating is readily performed in a hardware unit of the network device.

While the techniques are discussed in the above (and below) embodiments as being implemented on network devices, more broadly, the techniques may be used in any computing environment that employs linked lists, and more specifically linked list elements segmented by profiles.

Figure 1:
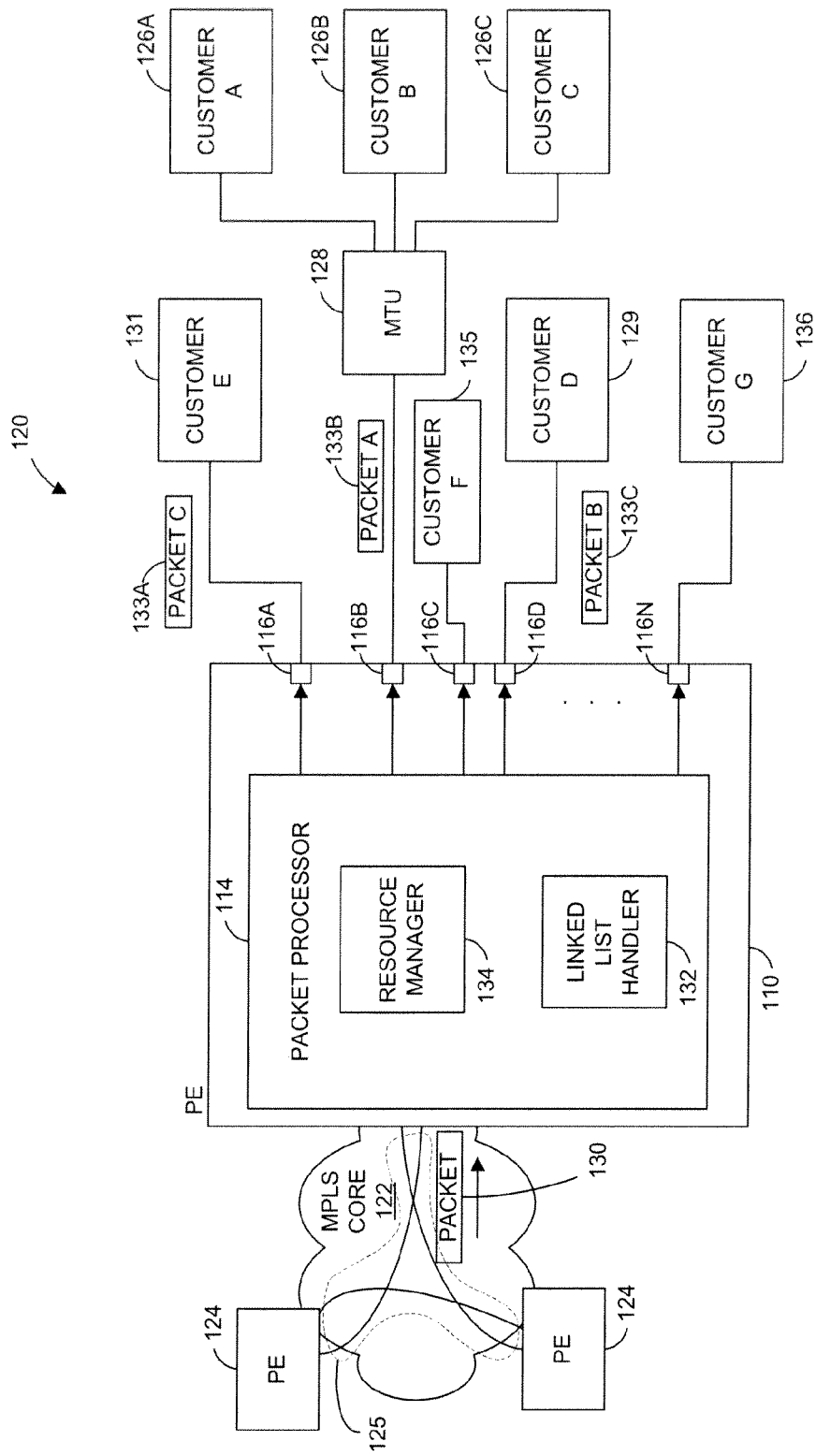
FIG. 1 is a block diagram of a network that includes network device using a linked list to affect packet communication.

To provide an example embodiment of the present techniques, FIG. 1 illustrates operation of a network device 110 in an example switching/routing embodiment of an example network 120. In the example of FIG. 1, the network device 110 is a provider edge device (PE) or a component thereof. The network 120 includes a multi-protocol label switching (MPLS) core network 122 having other PE's 124. The PE 110 and the PE's 124 are linked via a virtual private LAN service (VPLS) 125, illustrated by communication links connecting each of these elements. The PE 110 is communicatively coupled to a plurality of customer network devices 126A-126C via a multi-tenant unit switch (MTU) 128 connected to a physical port 116B; a customer network device 129 through a physical port 116D; and a customer network device 131 through a physical port 116A. In the illustrated example, the PE 110 includes a plurality of physical ports 116A-116N as shown. In other embodiments, each of these physical ports 116A-116N is coupled to a respective MTU or other switching device or directly with customer network devices. The network device 110 is shown with physical ports 116, However, the network device 110 may additionally include a number of extended ports, which are not physical entities, but merely logical assignments, and referred to herein as "virtual ports." Indeed, in the discussions herein, reference to physical ports, network resources, and physical resources are intended to encompass examples in which a network device also includes virtual ports.

In the example embodiment illustrated in FIG. 1, the PE 110 receives a packet 130 via the MPLS core 122. A packet processor 114 of the PE 110 manages egress communications from the PE 110 to the customer devices 126, 129, and 131 and ingress communications from these customer devices 126, 129, and 131 to the PE 110 and/or to any of the other PEs 124. Such packet management includes packet analysis, buffering, and copying, data computation, and routing management. For egress communication, the packet processor 114 processes the packet 130 and determines the intended customer devices and the corresponding ports 116 to reach those devices. In the illustrated example, the packet processor 114 produces three copies of the packet 130, designated 133A-133C, which are transmitted to the corresponding ports 116A, 116B, and 116C, respectively. In the illustrated embodiment, the packet processor 114 selectively does not communicate data packets to customer devices 135 and 136 connected to ports 116C and 116D, respectively. In other words, in the illustrated embodiment devices 135 and 136 are not members of the multicast group consisting of customer devices 126, 129 and 131. For ingress communication, the packet processor 114 processes packets ingressing via the physical ports 116, including making forwarding decisions (i.e., for egress via physical ports 116), determining whether a packet should be trapped or mirrored to another processor (not shown) for further analysis, determining whether a packet should be discarded, etc.

In the illustrated example, the packet processor 114 includes a resource manager 134 that manages operation of one or more resources on the PE 110, where a resource may be software executing on a programmable controller of the PE 110 or a dedicated hardware module within the PE 110. The packet processor 114 further includes a linked list handler 132, in communication with the resource manager 134, that handles a linked list accessible to the resources. Specifically, the linked list handler handles access to entries stored in the linked list, where in an embodiment these entries are attributes of one or more network devices, such as virtual or physical ports on the device, executable instructions, or more generally data elements that may be used by the resource.

For example, in an embodiment, the packet processor 114 is a communication interface manager interfacing the PE 110 with additional hardware coupled thereto. The resource manager 134 receives the packet 130 and determines if any of the supported resources desire to send the packet 130 to one or more of the physical ports 116, more specifically to one or more customer devices associated with the ports 116. In the illustrated example, the resource manager 134 copies the packet 130 to generate a plurality of duplicate packets to be egressed on the ports 116. The resource manager 134 requests that the linked list handler 132 handle providing the packets to the respective physical ports 116, by cycling through entries in a linked list stored in the handler 132, where each entry identifies a different physical port 116. Where the packet 130 is to be communicated to only a single port, copies of the packet 130 to be communicated are not made. The packet processor 114 communicates the packet 130 to a respective user, via a selected physical port 116, directly.

While the resource manager 134 and the linked list handler 132 are illustrated within the same packet processor 114 as PE 110 and ports 116, in other embodiments, a resource manager manages and the linked list handler handles packet resources across multiple different devices. For example, in some embodiments, a resource manager and linked list handler control communications across different packet processors and/or different PE's. In some embodiments, a resource manager and linked list handler controls communications with external switching devices, for example, where one or more switches has a distributed architecture. Thus, although the resource manager and the linked list handler are illustrated as contained within a particular network device, in some embodiments they are configured to provide resource manager services and linked list handling to other network devices, such as the MTU switch 128 connected to the PE 110. Further still, one or both of the resource manager and linked list handler may be contained in other network devices within a network, such as the MTU switch 128 or other switching device.

In some embodiments, the resource manager 134 manages the resources operating on the PE 110 to identify one or more profiles, each profile being identified by a different index value. Each profile identifies a particular subset of linked list entries, corresponding to resources, that are to be handled when called by the resource manager 134. Each profile, therefore, identifies a different subset of those linked list entries, within a linked list, that are to be handled (i.e., accessed, executed, etc.) for a calling resource. For example, in an embodiment each profile identifies a subset of active resources, e.g. which physical ports 116, that is available to a calling resource that applies a given profile. To identify which instructions are to be handled for a given profile, the resource manager 134 communicates one or more index values to a linked list handler 132 identifying one or more profiles. The linked list handler 132 receives each index value and determines the profile for the index value and the particular subset of linked list entries that are available for that profile. For each profile identified by the resource manager 134, the linked list handler 132 handles those entries identified as active according to the profile. If multiple profiles are identified by the resource manage 4, then the linked list handler 132 identifies the entries for each profile.

In some examples, the linked list handler 132 contains an egress linked list that includes a linked list entry for each port (physical port 116 and any virtual ports) on the PE, 110 and an egress linked list profile table that identifies various profiles each representing subsets of those ports 116 that are to be used for routing the packet data 130. For egress communication, the profiles indicate different combinations of ports 116 that will receive a copy of the packet 130. Which profile, i.e., which combination of ports, are identified for egress communications may depend, for example, on which particular resource is operating on the resource manager 132, as the resource manager 132 determines the profile based on the operating resources. For ingress communication, data from the customers 126, 129, and 131 is routed to different resources on the PE 110 and/or to different PE's 124, based on an ingress linked list and corresponding ingress linked list profile table, also stored in the linked list handler 132.

In some embodiments, therefore, a linked list includes link list entries that correspond to an attribute on the network device containing the linked list handler. Such attributes can be a virtual or physical port on the network device, for example. In other embodiments, however, the linked list includes link list entries that correspond to attributes on devices external to the network device having the linked list handler. For example, the linked list may include entries attributable to an external device such as a network switch connected to the network device through a communication link.

The embodiment of FIG. 1 discusses a resource manager and a linked list handler used in a packet processor. More broadly, however, the techniques may be used in any computing environment where linked lists are used, whether or not for communication purposes. These techniques may be used for any computerized operation that may be executed using a linked list and profile on a stored, computer accessible profile table.

Figure 2:
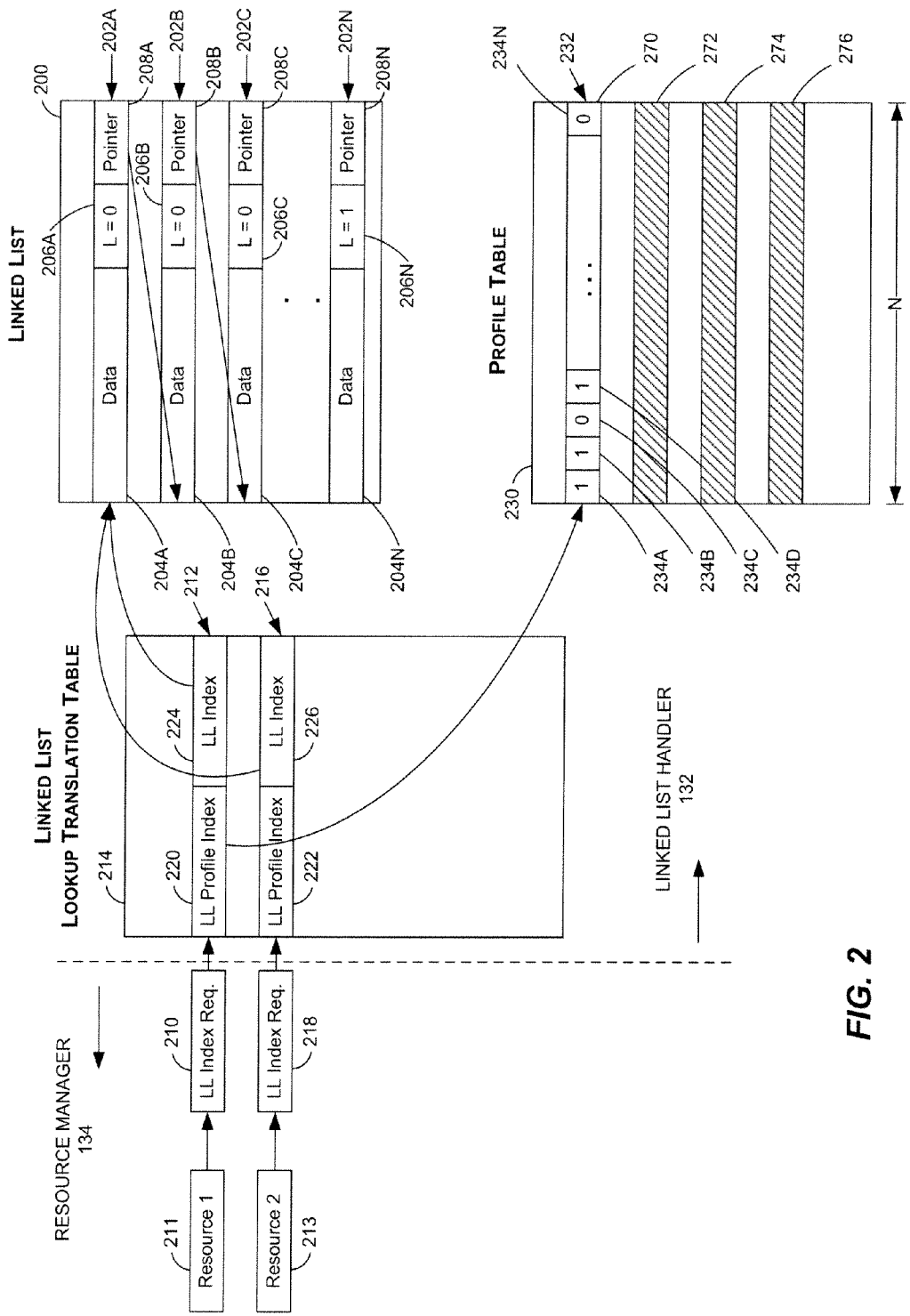
FIG. 2 is an illustration of an example linked list profiling configuration, including a linked list lookup translation table, a linked list, and a profile table.

FIG. 2 illustrates an example use of profiles to identify subsets of link list entries that can be accessed, as a group, by a resource manager. These profiles are associated with a linked list, storing these entries, by an indexing, also shown. In accordance with an embodiment, a Linked List 200 is created by and stored in the linked list handler 132. It is noted that, in an embodiment, more than one linked list is defined within PE 110. In some such example, the different linked lists define, for instance, physical resources that are associated with a particular network when the PE 110 serves more than one network.

The linked list 200 illustrated in FIG. 2 includes numerous Linked List Entries 202A-202N, each of which contains a Data Field 204A-204N identifying, for example, one of the physical ports 116A-116N of the PE 100 and a Last Field Bit 206A-206N. The Last Field Bits 206A-206N are set to logic 0 for each of the entries except for the last entry in the Linked List 200, which is 206N in the illustrated embodiment. The Last Field Bit 206N in the last entry 202N is set to Logic 1 to indicate that it is the last entry in the Linked List 200. The Entries 202A-202N also include Pointer Fields 208A-208N, respectively, each containing a pointer pointing the linked list handler 132 to the beginning of the next linked list entry in the Linked List 200. The Pointer Field 208A of Entry 202A, for example, contains a pointer (e.g., a vector pointing to the Data Field 204B of Entry 202B. In the illustrated embodiment, each Pointer Field 208 points to the next sequential Entry 202, but in other embodiments, pointer fields point to any entry in a linked list.

In accordance with an embodiment, the Linked List 200 is not bound in size and can contain any suitable number of linked list entries, N, as set forth by the linked list hander 132. In a network device, the number of linked list entries, N, may correspond to the quantity of physical resources handled by the network device, e.g., the number of physical ports 116 in the PE 110. The entries in a linked list are handled by the link list handler, which, in some embodiments, includes the linked list handler 132 routing data to the physical resources identified in a linked list. In other examples, the linked list may include executable instructions, instead of physical resource descriptions, in which case, entries in the linked list are handled by execution either within the linked list handler 132 or within the resource manager 134.

To define different combinations, or subsets, of the Entries 202, for example, different combinations of the ports 116, profiles are used. Each profile defines a different subset of entries; and each profile is separately identified by an index value. The profile provides an additional layer of resolution beyond the linked list entries. For example, in servicing a networking application in an organization, the linked list entries may represent all ports servicing a division within that organization, while each profile defines, at an additional layer or resolution, different combinations of departments within that division. Or, by way of another example, the linked list entries may represent all user stations in a department, while each profile presents different combinations of user stations that are to receive a data packet. In any event, to link the different profiles with the linked list, a lookup translation table is used, thereby allowing a linked list handler to store numerous profiles and numerous linked lists while having a single lookup tool for accessing each.

In the illustrated embodiment, a Linked List Lookup Translation Table (LTT) 214 establishes a relationship between the Linked List 200 and one or more profiles stored in a Profile Table 230, by use of a profile index field and a linked list index field. For example, after determining that a profiled set of entries within a linked list is to be handled, a resource 211 in the resource manager 134 sends a Linked List Index request 210 to the linked list handler 132. The Linked List Index request 210 corresponds to a particular profile of the entries contained with a linked list. In the illustrated example, the linked list handler 132 receives the request 210 and looks for a corresponding Profile Index Element in a Linked List Lookup Translation Table (LTT) 214, where a Profile Index Element identifies an address for a particular profile. In the illustrated example, the Linked List Index request 210 corresponds to a first Profile Index Element 212 contained in the LTT 214. In other examples, instead of the resource identifying a linked list index request, the profile is identified by the linked list handler 132 directly or by another source, such as another network device.

In the example illustrated of FIG. 2, the LTT 214 includes two Profile Index Elements 212, 216, each identifying a different profiled set of entries. A second resource 213 sends to the linked list handler 132, a Linked List Index Request 218 that identifies Element 216 in the LTT 214. Each Element 212, 216 contains a Linked List Profile Index 220, 222, that identifies a different profile in a Profile Table 230, and a Linked List Index 224, 226, that contains a pointer (e.g., a vector) identifying an entry point of the Linked List 200. In this way, the linked list handler 132 accesses the LTT 214 to identify the linked list set of instructions to be handled and the profiles that set which of those instructions are to be handled. In the illustrated example, the LTT 214, the Linked List 200, and the Profile Table 230 are all contained in different addressable data structures, each stored in the linked list handler 132.

Furthermore, while a single linked list is illustrated, it will be understood that the linked list handler 132 may store multiple different linked lists, each identified by a different linked list index field within the LTT 214. An example is discussed in FIG. 5

In the illustrated example, each Element 212, 216 in the LTT 214 points to Entry 202A. In other examples, however. Elements 212, 216 are able to point to any Entry 202 within the Linked List 200.

The Profile Index 220 identifies a first Profile 232 in the Profile Table 230. Profile 232 includes a Linked List State Bit 234A-234N, one for each Linked List Entry 202A-202N. The State Bits 234 identify whether a particular entry is in an active state or an inactive state.

In the illustrated example, the Profile 232, thus, defines a profile in which at least the Linked List Entries 202A, 202C and 202N are active and at least the Linked List Entry 202C is inactive, for this particular profile. In the Profile Table 230, a State Bit value of logic 0 indicates that the corresponding Linked Link Entry 202 assigned to the State Bit 234 is not active, while logic 1 indicates it is active. In the example seen in FIG. 2, the Profile Table 230 includes any number of different profiles, each identified by a respective one of the Linked List Profile Indexes 220, 222, etc., where each profile includes different possible combinations of active and inactive states for the Linked List Entries 202.

In an example embodiment, the packet processor 114 receives the packet 130 and passes the packet 130 to the resource manager 134, which determines that the resource 211 wants to transmit the packet 130 to a first subset of the ports 116. The resource manager 134 communicates the Linked List Index Request 210, associated with that first subset of ports 116, to the linked list handler 132, which then identifies Element 212 in the LTT 214. The linked list handler 132 identifies Profile 232 as corresponding to the Request 210, as identified by the Profile Index 220. The linked list handler 132 then handles the Linked List Entries 202 in accordance with the active/inactive states defined in the Profile 232. In the illustrated example, when executing Profile 232, the linked list handler 132 instructs the packet processor 114 to send the packet 130 to at least ports 116A, 116B, and 116D (all identified as active ports), and at least no/pods 116C and 116N (identified as an inactive ports). In accessing the Linked List 200, the handler 132 first executes Entry 202A (State Bit 234A is 1), then Entry 202B (State Bit 234B is 1), as identified by the Pointer Field 208A. The handler 132 is then pointed to Entry 202C, but the handler 132 skips execution of the Entry 202C (i.e., skips sending packet data to the port 116C in this example), because State Bit 234C in the Profile Table 230 is set to 0, i.e., inactive. The handler 132 continues in this manner until the final Entry 202N (as indicated by Last Bit Field 206N) is executed (State Bit 234N is 1).

In the illustrated example, the Profile Table 230 is N bits in length, meaning that each Profile is initially set to N bits in length. The Profile Table 230 also has a number of addressable slots (slots 270, 272, 274, and 276 are shown), where the number of slots depends on the number of profiles defined by the Profile Table 230. In the illustrated example, each of the slots is N bits in length.

Figure 3:
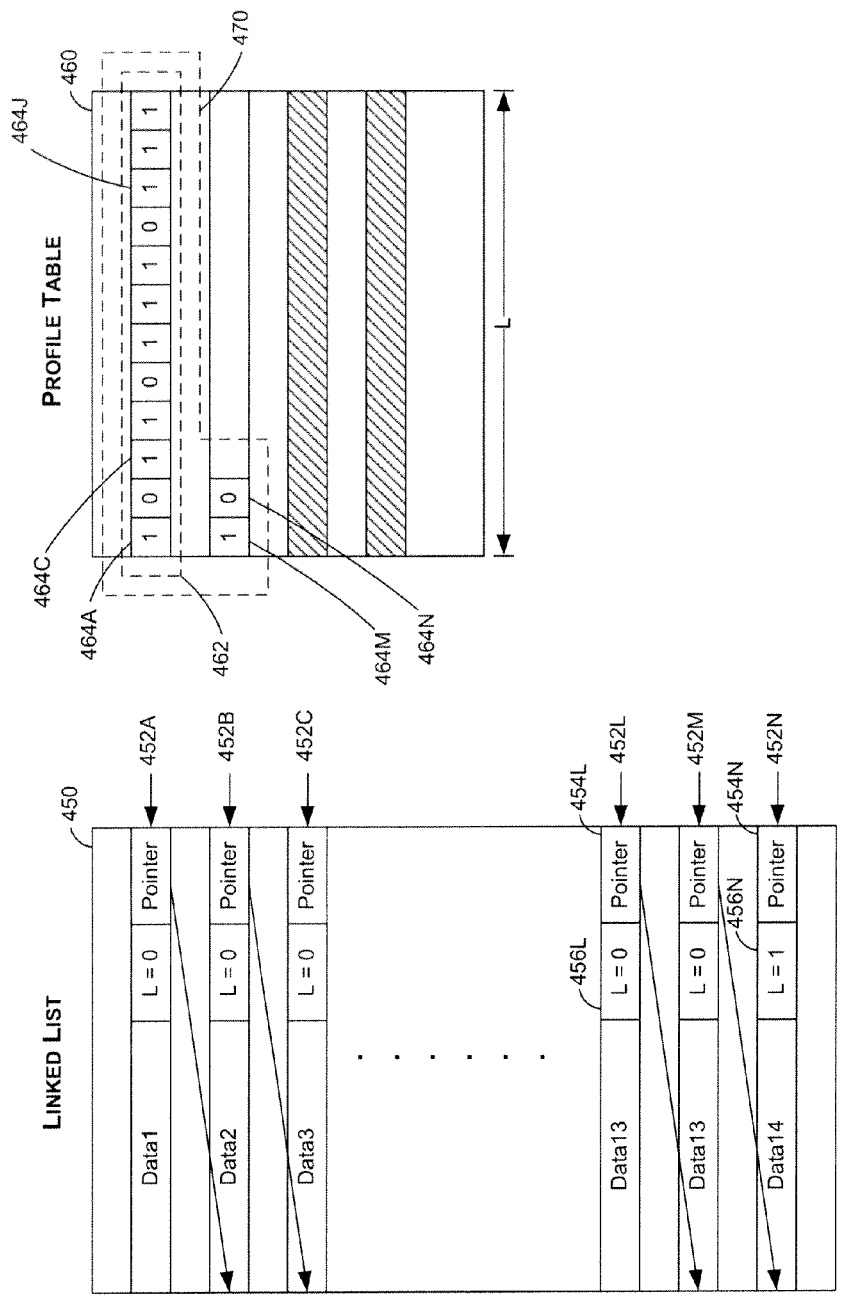
FIG. 3 is an illustration of a linked list and a linked list profile table after the addition of entries to the linked list, in accordance with the example of FIG. 2.

As the linked list handler 132 is called to add additional linked list entries, the size of the profile will increase accordingly. FIG. 3 illustrates an example configuration in which new entries are added to a linked list and attendantly, new state bit fields, corresponding to those new entries, are added to each profile. For each new entry added to a linked list, an additional state bit is added to each profile.

Figure 4:
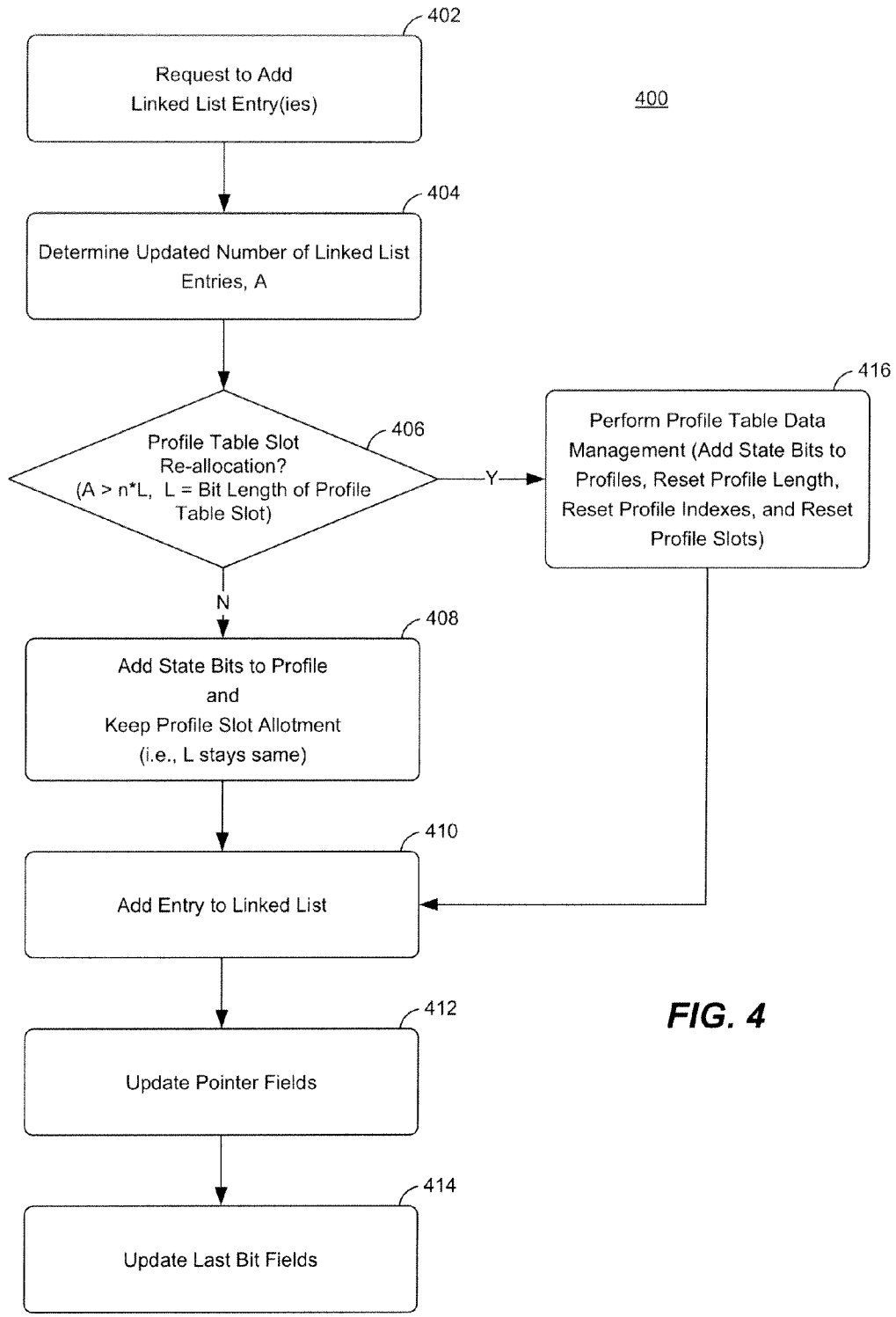
FIG. 4 is a flow diagram of an example method of updating a linked list by adding linked list entries as shown in FIG. 3.

FIG. 4 illustrates an example method 400 for adding entries to a Linked List 450 and Profile Table 460, as shown in FIG. 3. Initially, the Linked List 450 has L Entries, 452A-452L, and the Profile Table 460 has a Profile 462, L bits in length, where L=12.

A linked list entry may be added at any location in the Linked List 450, i.e., at the beginning, end or between any existing Linked List Entries 452A-452L. Initially, the Profile Table 460 includes L=12 States Bits 464A-464L, one of each of the Linked List Entries 452A-452L.

In the illustrated example method now described with reference to FIG. 4, at a block 402, a resource, such as a physical or virtual port manager of the resource manager 134, requests to add one or more linked list entries to the Linked List 450, specifically as seen with reference to the example of FIG. 3 two Linked List Entries 452M and 452N. A block 404, executed by the linked list handler 132, determines the updated total number of entries, A, after the addition. A block 406 determines whether the new total number of entries, A, requires a new slot re-allocation for the profiles. That is, in the illustrated embodiment, block 406 determines if A exceeds the initial bit-length of the profile table slot, i.e., L. In general, however, the block 406 determines if the increase in entries results in A changing from a value that is less than n*L to a value greater than n*L, where n is an integer. If A changes in this manner, then block 406 determines that profiles must be allocated additional slots in the profile table.

If a new slot re-allocation is not required, then at a block 408, the link list handler adds State Bits 464M and 464N to the Profile 462 and maintains the profile size at, L, before passing control to a block 410, where the linked list handler adds the Linked List Entries 452M and 452N to the Linked List 450. At a block 412, the linked list handler then updates Pointer Fields 454A-454N, as necessarily; and a block 414 resets a Last Bit Fields 456A-456N, as necessary.

If new slot re-allocation for the profiles is required, then block 406 passes control to a block 416, where a link list handler performs profile table data restructuring. Specifically, at the block 416, the linked list handler increases the size of the Profile 462 by two State Bits 464M and 464N to form Profile 470 (FIG. 3). In the illustrated example, to increase the profile size beyond the initial maximum bit length, L, at the block 416, the linked list handler re-allocates a second profile slot of the Profile Table 460 to the Profile 462, forming Profile 470. The linked list handler sets the new profile bit length, L, to L=L+(A−L), to reflect the increased size. The bit length of a profile is thus defined by the overall size of its corresponding profile table. At the block 416, the linked list handler also re-allocates any other profiles in the Table 460 to other slots (see, e.g., FIG. 5 by buffering and rewriting these profiles). The linked list handler then resets the corresponding profile index values in the linked list lookup translation tables, to reflect new starting bit addresses for the profiles in the Profile Table 460. Control is then passed to the block 410.

Figure 5:
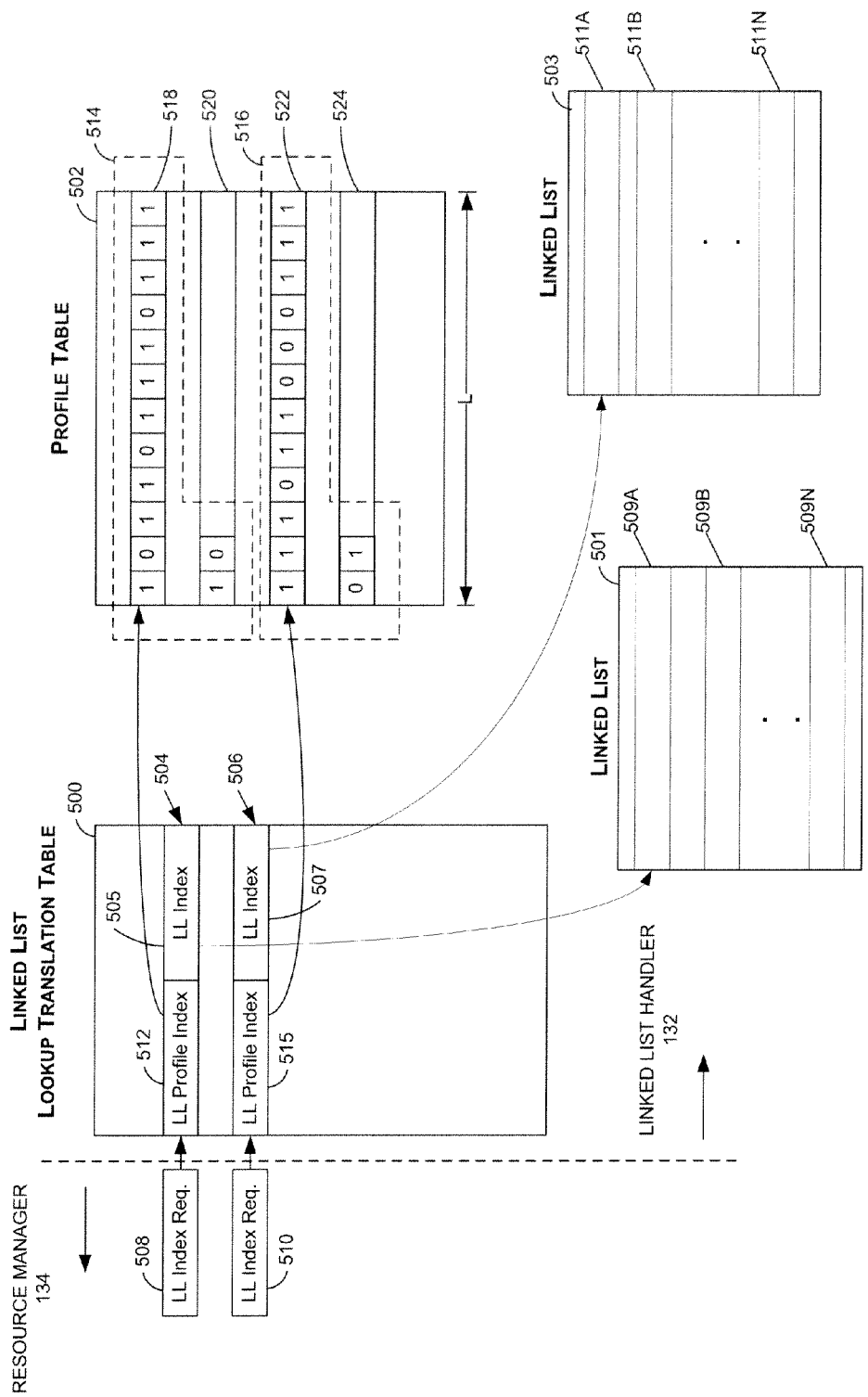
FIG. 5 is an illustration of a linked list lookup translation table and a profile table in accordance with an example.

FIG. 5 illustrates a Lookup Translation Table (LTT) 500 that relates a Profile Table 502 with two different Linked Lists 501 and 503, in accordance with an example. In the illustrated example, the LTT 500 has two Elements 504 and 506 each corresponding to a different Linked List Index Request 508 and 510, respectively. The LTT Element 504 has a Linked List Profile Index 512 that identifies a first Profile 514 in the Profile Table 502, while LTT Element 506 has a Linked List Profile Index 515 that identifies a second Profile 516 in the Table 502. The Profiles 514 and 516 correspond to different combinations of active and inactive linked list entries, as indicated by the different state bit values shown. In the illustrated example, the Profile 514 defines a subset of Entries 509A-509N in the first Linked List 501 as identified by an LL Index 505, while the Profile 516 defines a subset of Entries 511A-511N in the second Linked List 503 as identified by an LL Index 507. The two Linked Lists 501 and 503 are stored in separate data tables in the illustrated example, while in other examples, linked lists may be stored in a single data table.

In the illustrated example, the Profile 514 is 14 bits in length and therefore extends over two (L bit long) Slots 518 and 520 in the Profile Table 502. If the bit width of the Profile 514 is between 2L and 3L, where L is the initial maximum bit length, then three Slots 518, 520, and 522 would be used for this profile, in which case block 416 would erase Profile 516 from Slot 522, store the Profile 516 in a buffer memory, and rewrite the Profile 516 starting at the next available Slot 524. In other embodiments, for example, where the entire number of bits in the Profile Table 502 is limited, profiles may be appended contiguously to one another, i.e., appended at the next available bit after a preceding profile. However, writing each profile on a different slot of the Profile Table 502 allows for more efficient addressing of the profile index and allows the linked list handler to add linked list entries without having to constantly (or at least more frequently) rewrite profiles in the profile table to accommodate the increase in profile size.

Figure 6:
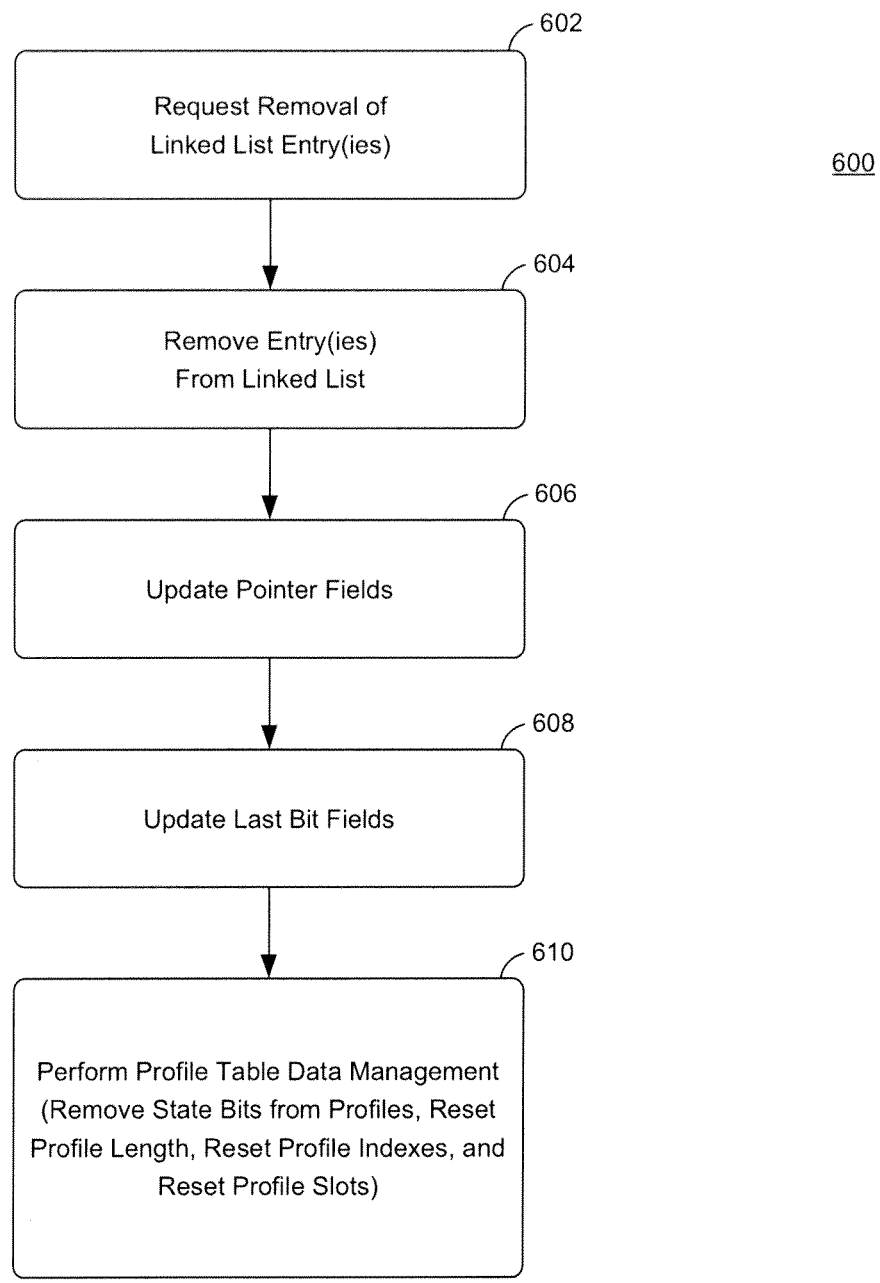
FIG. 6 is a flow diagram of an example method of updating a linked list by removing linked list entries.

To block a linked list entry from access, the profile state bit for a linked list entry is set to 0. To block that entry from being executed under all profiles, then all the corresponding state bits in all profile entries must be set to 0, i.e., without having to remove the linked list entry. By disabling a linked list entry in this manner, the overall pointer path of the linked list does not change. In some embodiments, however, a linked list handler will completely remove a linked list entry from the linked list. For example, if physical resources, such as a group of ports, are completely disabled, then, in some embodiments, the linked list handler 132 removes, from the linked list, the linked list entries identifying the disabled ports. The linked list handler would correspondingly remove associated state bits from the profiles associated with that linked list. FIG. 6 illustrates an example method 600 that provides a technique for removing a linked list entry from a linked list. At a block 602, a resource manager, e.g., in response to a program running on a packet processor, requests removal of one or more linked list entries. At a block 604 the linked list handler removes the identified entries from the linked list, at a block 606, the linked list handler updates corresponding pointer fields in the linked list, and at a block, the linked list handler updates last bit fields to indicate the end of the linked list entries, as necessary. The last bit field only needs updating if the removed linked list entry is the last entry, otherwise the last bit field values do not change.

At a block 610, the linked list handler performs profile table data restructuring. Specifically, the linked list handler removes the corresponding state bits from profiles, concatenating the remaining state bits together for each profile. At the block 610, the linked list handler determines the new profile bit length and determines whether the profiles are to be assigned to a smaller number of slots in the profile table. If so, then the profile slot assignments are reset and the corresponding linked list profile index values in the linked list lookup translation tables are reset to point to the new profile starting bit addresses.

In the foregoing examples, the number of linked list entries and the number of bits that make up a profile are adjustable, as discussed with reference to methods 400 and 600. Such adjustments may be performed in hardware or software on a device. Because multiple operations are used during the methods 400 and 600, in some examples, if a resource (beyond the requesting resource) requests a linked list handler to access the linked list during a profile update, that request is delayed until completion of the adjustment process. In other examples, the linked list handler will fulfill the resource request according to a previous data structure for the linked list and profile table, instead of awaiting completion of the adjustment process.

In another profiling configuration, the linked list handler adds/removes linked list entries to/from a profile atomically, i.e., using a single operation on the linked list. Such a technique is able to adjust subsets of the resources faster than changing linked lists. This configuration minimizes the number of operations needed to effect a profile change and therefore results in lower delay times from a profile update. As a result, profiles may be updated without changing the overall data structure of the linked list, thereby allowing simultaneous resources to operate on a consistent linked list data structure.

Figure 7:
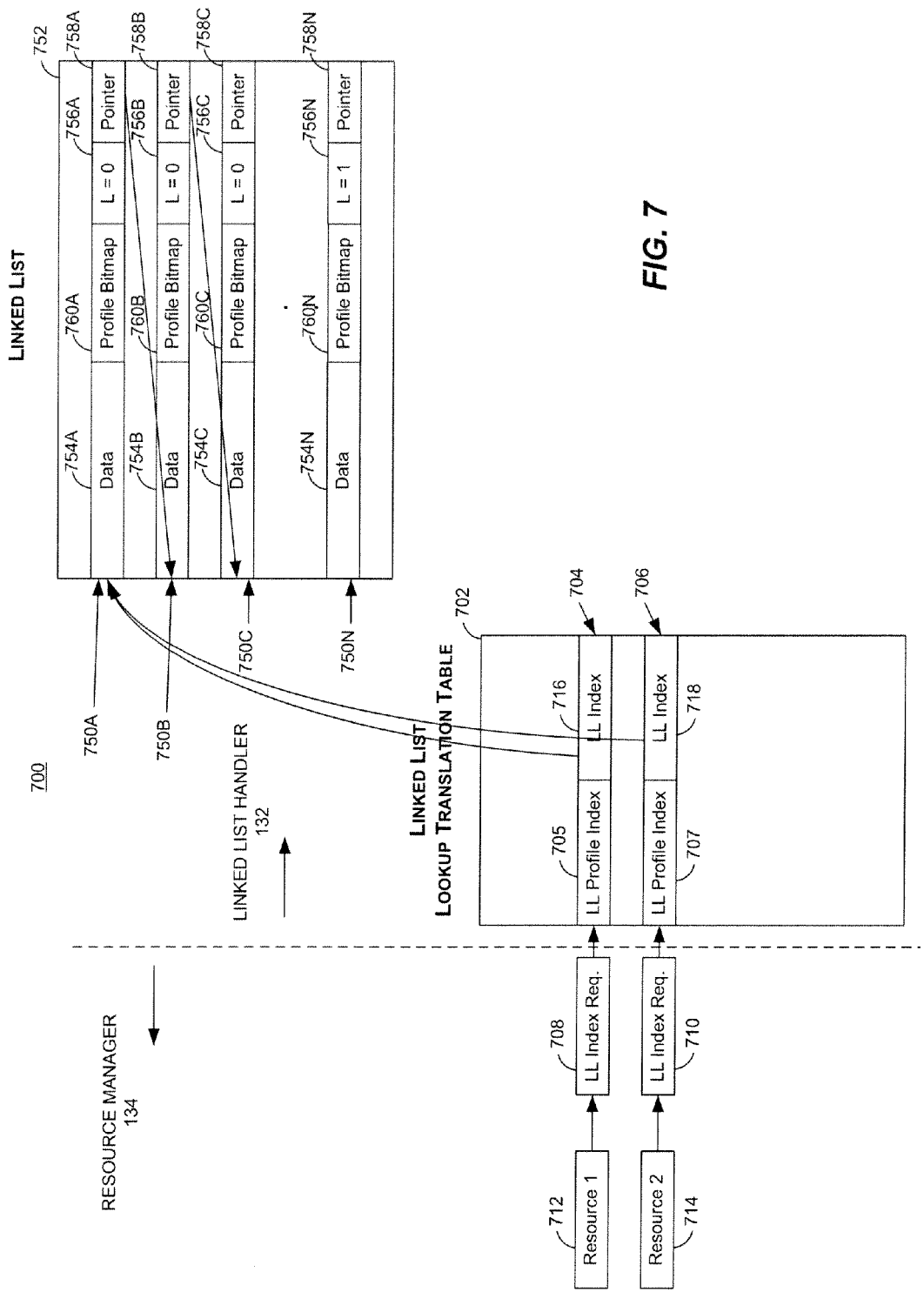
FIG. 7 is an illustration of another example linked list profiling configuration, including a linked list lookup translation table and a linked list, where each linked list entry contains a profile bitmap.

FIG. 7 illustrates an example configuration 700 of a technique formed of a Linked List Lookup Translation Table (LTT) 702 but no separate profile table, as in the examples discussed above. Instead, each line of the linked list includes a profile bitmap field that indicates a profile. In the example of FIG. 7, the LTT 702 contains two Elements 704, 706 identifying different profiles, invoked by Index Requests 708, 710, respectively. For example, a first resource 712 may issue the Index Request 708 corresponding to the Element 704, while a second resource 714 may issue the Index Request 710 corresponding to the Element 706. Both Elements 704, 706 have Linked List Index Fields 716, 718 that identify a first Entry 750A in the Linked List 752. Similar to the Linked List 200, the Linked List 752 includes numerous Entries 750A-750N, each including a Data Field 754A-754N, a Last Bit Field 756A-756N, and a Pointer Field 758A-758N, containing corresponding vectors.

Figure 8:
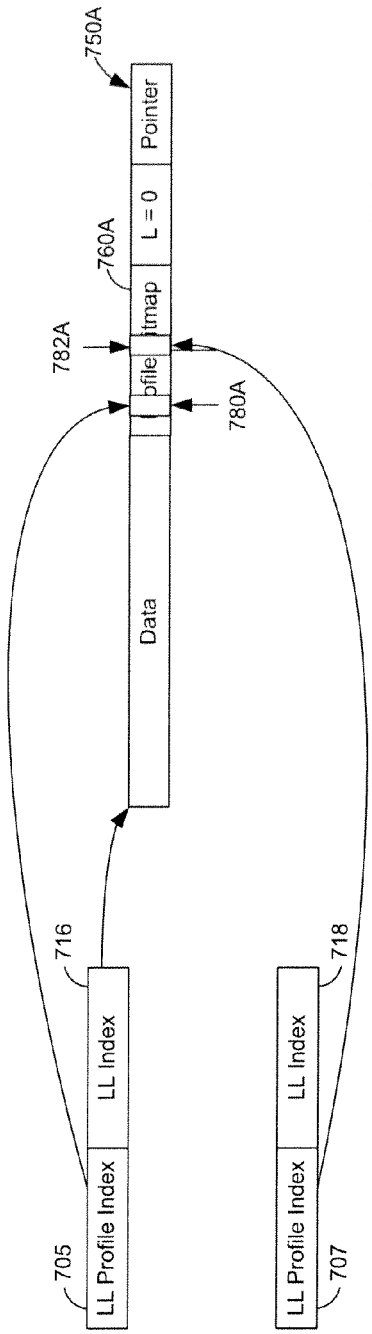
FIG. 8 is an illustration of a linked list lookup table element and a corresponding linked list entry.

As noted above, in place of a profile table, each Entry 750A-750N in the Linked List 200 contains a Profile Bitmap Field 760A-760N, which, as discussed further below, contain data used to define different profiles of the Entries 750A-750N. In the illustrated example, a Linked List Profile Index 705 for the Element 704 identifies a position in the Profile Bitmap Fields 760 that contains the respective State Bits for Entries 750A-750N. For example, as seen in FIG. 8, the Index 705 identifies a first State Bit 780A of the Bitmap Field 760A. A second Index 707 (of the Element 706) identifies a second State Bit 782A also within the Bitmap Field 760A. Each state bit of a profile bitmap contains logic 0 or 1 identifying whether the entry to a resource is inactive or active for the profile assigned to that state bit. For example, in the illustrated embodiment, the State Bit 780A determines the active or inactive state of the Entry 750A for a first profile called by the Element 704. The State Bit 782A determines the active or inactive state of the Entry 750A for a second profile called by the Element 706. In this manner, an entire profile is defined by the state bits within a column of the Profile Bitmap Fields 760A-760N.

Figure 9:
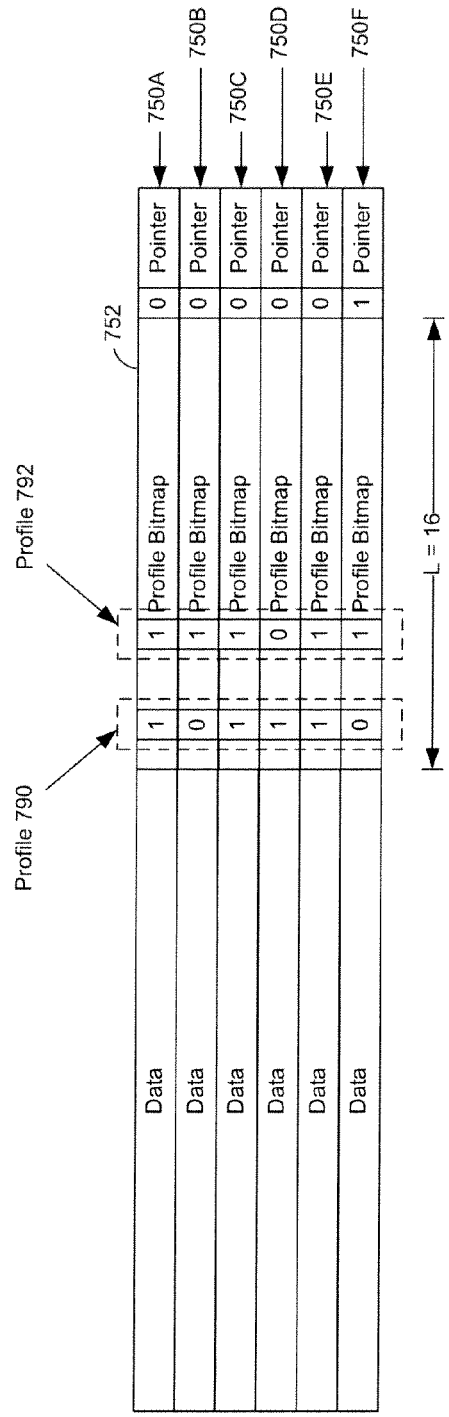
FIG. 9 is an illustration of a linked list showing different state bits for two different profiles of the linked list entries.

As illustrated in FIG. 9, a first Profile 790 is formed by the state bits in a first bit position; and a second Profile 792 is formed by the state bits in a second bit position. For the illustrated example, the number of Linked List Entries 750.N, is arbitrarily taken as 6 for simplicity of explanation other numbers of entries are possible, which means that each Profile 790 and 792 in the example seen is six bits in length.

In the illustrated example, the Profile Bitmap 760 bit length, L, is 16 bits, but may be set to any size. This length, L, sets the total number of profiles that may be supported in the LTT 702 and thus the total number of profiles accessible to a calling resource. Profile bitmaps of different lengths can be provided by making available suitable number of bit locations in the profile bitmap field.

Figure 10:
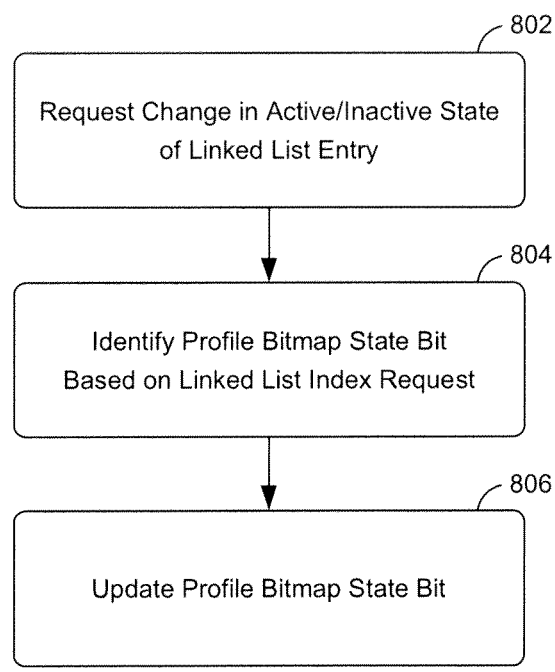
FIG. 10 is a flow diagram of an example method for updating a linked list in accordance with the example profiling configuration of FIG. 7.

FIG. 10 illustrates a method 800 for updating a profile (i.e., adding or removing linked list entries from a profile) in accordance with the example of FIGS. 7-9. Because the Profile Bitmap Field 760 instructs whether each Entry 750 is active (i.e., to be accessed) or inactive (i.e., to be bypassed), with the method 800 profiles may be updated without changing the data structure of the Linked List 752.

At a block 802, a resource requests to change the active/inactive state of an Entry 750A-750N for a particular profile identified by a profile index. In some examples, the block 802 is executed by a resource manager. The block 802 provides a linked list index request to a block 804, where a linked list handler determines the corresponding profile index number, i.e., the corresponding state bit address in the Profile Bitmap 760. At a block 806, the linked list handler updates the state bit identified by block 804 according to the request from the resource at block 802. In this way, if a linked list entry is to be added to a profile, then the corresponding state bit for that entry in the profile bitmap address assigned to that profile (e.g., one of the 16 bit positions) is set to 1. If an entry is to be removed from a profile, then the same state bit is set to 0. If the active/inactive states for multiple entries must change, at the block 806, the linked list handler will update each of the entries according to the state bit addresses identified by the block 804. Because a single process step (806) is used to perform profile updating, this profile configuration is considered atomic.

In the described embodiment, the method 800 is implemented entirely in hardware on a network device or other hardware device, while the methods 400 and 600 are at least partially implemented in hardware. More generally, however, the various blocks, operations, and techniques described above may be implemented in hardware, firmware, software, or any combination of hardware, firmware, and/or software. When implemented in hardware, some or all of the blocks, operations, techniques, etc. may be implemented in, for example, a custom integrated circuit (IC), an application specific integrated circuit (ASIC), a field programmable logic array (FPGA), a programmable logic array (PLA), etc.

Figure 11:
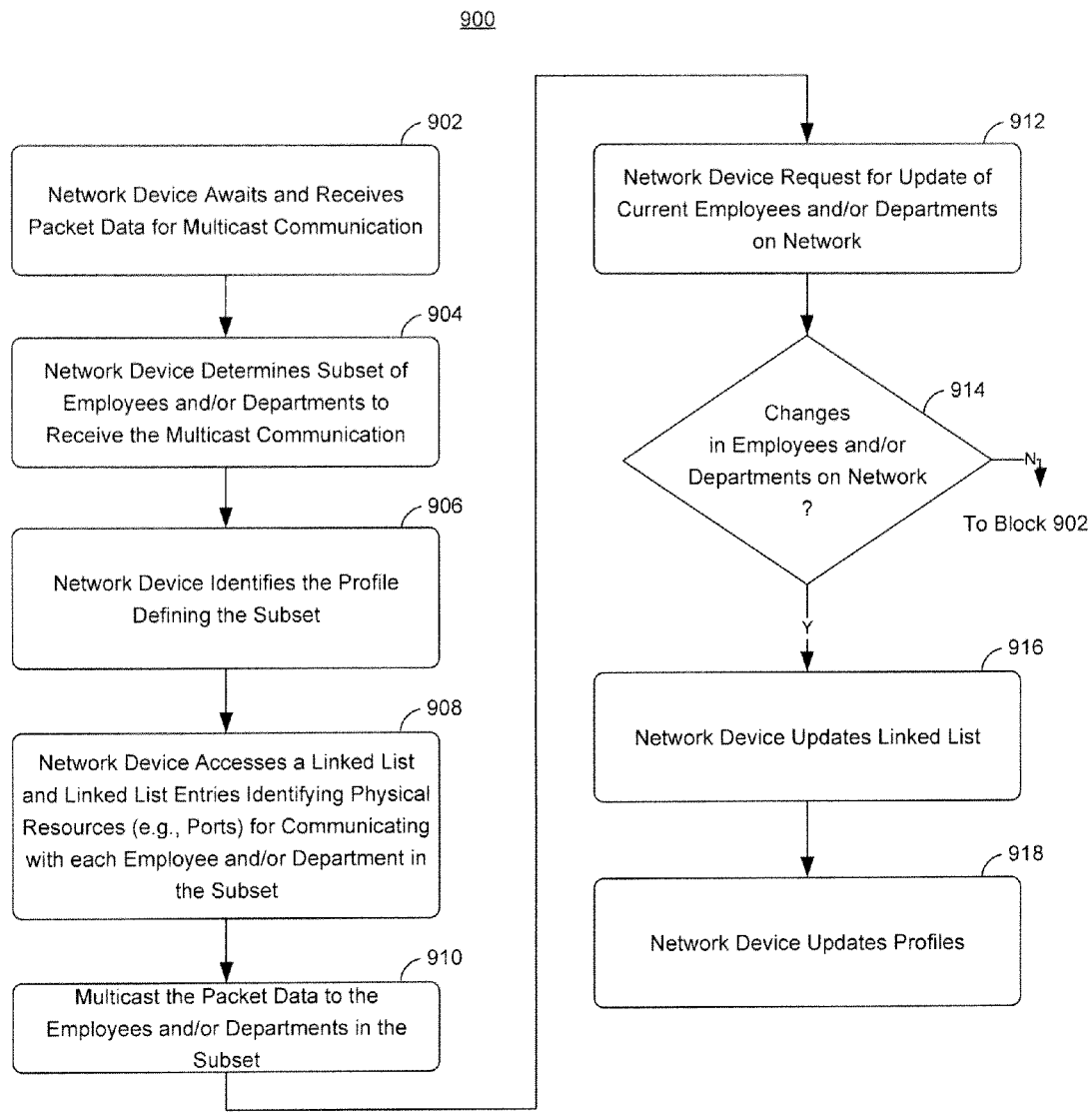
FIG. 11 is a flow diagram of an example method for transmitting a multicast message and updating profiles of recipients of multicast messages.

FIG. 11 illustrates a method 900 for multicast transmission in an organization. At a block 902, a front end network device for managing multicast communications on a network (e.g., the PE 110) receives packet data to be communicated to a series of employee network devices and/or to a series of department network devices, where each department has one or more employee network devices. The packet data is provided to a packet processor within the multicast network device, where that processor accesses a resource manager, at a block 904, that determines where the packet data is to be communicated in a multicast environment, i.e., to what employees and/or departments. In the illustrated example, the initial multicast communication is based on the present, known number of employee stations and/or departments. In other examples, the network device may update the employee and department network devices before the multicast communication.

In the illustrated example, at the block 904, the resource manager examines the packet data and determines which subset of available receipts are to receive the multicast data. For example, at the block 904, the resource manager may determine that all employees within a particular department are to receive the packet data in a multicast communication, or that only those employees previously assigned to a particular group are to receive the multicast data, such as employees working on a particular project. Higher up the organizational level, the resource manager may identify which departments within an entire division are to receive the multicast data. Further still, in yet other examples, the resource manager not only determines which departments within a division are to receive the multicast data, but also which particular employees within that division are to receive that data. This later example is useful, for example, where a department is serviced by an external network routing/switcher device like an MTU.

At a block 906, a linked list handler receives the determination from the resource manager e.g., in the form of a linked list index request, and determines the subset of linked list entries corresponding to the request, i.e., the profile corresponding to the request. For example, in an embodiment, the linked list handler accesses a lookup table that identifies the profile corresponding to the determination of the resource manager. The linked list handler then accesses the profile and identifies the linked list associated with that profile. In another embodiment, the linked list handler determines the profile, not be accessing a lookup table, but rather by accessing a linked list having an embedded profile map stored therein. However the determination, at a block 908, the linked list handler accesses the entries in the linked list according to the profile setting; and because these entries corresponding to physical resources, e.g., physical ports, for communicating with identified recipients, the linked list handler identifies the communication links for multicasting the data to the identified employees and/or departments.

At a block 910, the network device multicasts the data to the subset of employees and/or departments identified by the profile as instructed by the block 906. In the illustrated example, each entry in the linked list identifies a physical port for a different employee in the organization or a different department of the organization.

To update the profile and linked list, in the illustrated example, at a block 912, the network device sends a request to determine if any employee or department network devices have been added to or removed from network since the last update to the linked list and profile. In some examples, at the block 912, the network device broadcasts a sounding request on the network through all physical resources, e.g., through all ports, for all connected employee and department network devices to respond with an acknowledgement signal. At a block 914, the network device receives the acknowledgement signals and determines if any employee or department network devices have been added or removed from the network. In some embodiments, at the block 914, the network device, e.g., a linked list handler, compares the received acknowledgement signals to the entries stored in one or more linked lists in the linked list handler. If it is determined that the no network devices have been added or deleted, the process returns to block 902.

If updates are needed, control is passed to a block 916, where the network device (e.g. a linked list handler) updates the linked list by adding entries for any employee network devices and department network devices added to the network. Also, at the block 916, the network device updates the linked list by removing entries for employee network devices and department network devices removed from the network. At a block 918, the network device (e.g., a linked list handler) updates all profiles to reflect the added or removed employees and departments. In some embodiments where there are multiple linked lists stored in a network device, at the blocks 916 and 918, the network device first identifies which linked list is affected by the additional or removal of network devices, and then only that linked list and associated profiles are updated. After updating, control is passed back to block 902 to await further requests for multicast communication, where these communications will be to the updated list of employees and/or departments according to the newly updated profile, or profiles.

Figure 12:
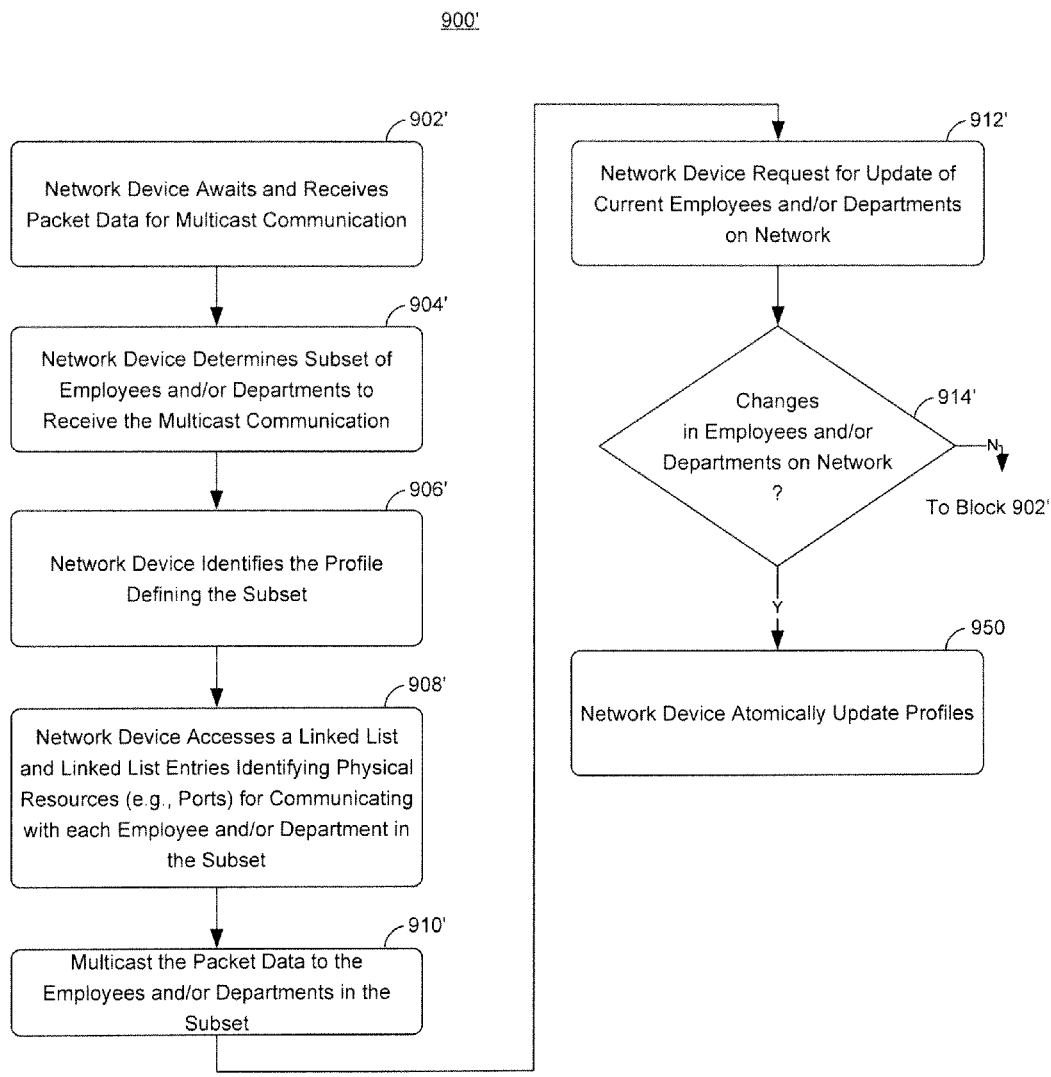
FIG. 12 is a flow diagram of another example method for transmitting a multicast message and updating profiles of recipients of multicast messages.

FIG. 12 illustrates another example process 900' similar to that of process 900, and therefore bearing like references numbers. In place of the blocks 916 and 918, at a block 950, the network device updates profiles, e.g., profile status bits corresponding to the added employee and/or departments, to indicate an addition (change status bit from "0" to "1") of a network device to the profile or to indicate a removal (change status bit from a "1" to "0") from the profile. In this way, an employee or department can be added without changing the linked list.

When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data.

Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for transmitting a multicast message over a network, the method comprising:

accessing, in a network device, a profile defining a subset of entries of a linked list, wherein the subset of entries of the linked list is less than all entries of the linked list, where the profile is accessed from among a plurality of profiles, each profile defining a different subset of entries of the linked list, where the entries of the linked list are arranged such that each entry, except for the last entry, contains a pointer to another entry in the linked list, where each entry of the linked list identifies a different network resource of the network device, where each network resource is for communicating with a different network device on the network, wherein each network resource corresponds to a different port on the network device such that the linked list entries identify a plurality of the ports on the network device and such that the profile identifies a subset of the plurality of the ports on the network device, and where the profile stores state bits corresponding to a state of each entry of the linked list, the state bits identifying whether an entry of the linked list is included in the subset;

using the profile to identify the subset of entries of the linked list; and transmitting the multicast message to only the network resources identified in the subset of entries of the linked list and not to the network resources identified in other entries of the linked list.

2. The method of claim 1, wherein each network resource corresponds to a different physical port on the network device, such that the linked list entries identify a plurality of the physical ports on the network device and such that the profile identifies a subset of the plurality of the physical ports on the network device.

3. The method of claim 2, wherein accessing the profile comprises:

identifying, in a lookup table of the network device, a profile index for the profile and a linked list index for the linked list corresponding to the profile; and determining which of the linked list entries are active based on the state bits stored in the profile.

4. The method of claim 3, further comprising updating the profile to indicate the addition of a new network device on the network or the removal of a previous network device from the network by changing a state bit in the profile.

5. The method of claim 4, wherein updating the profile further comprises adding to the linked list an entry corresponding to the new network device or removing from the linked list an entry corresponding to the previous network device.

6. A method of managing a multicast group of network devices on a network, the method comprising:

defining, in a network device, a linked list having a plurality of linked list entries corresponding to network resources of the network device and defining a plurality of profiles associated with the linked list entries, where each linked list entry, except for the last entry, contains a pointer to another entry in the linked list, wherein at least one profile comprises a state bit for at least some of the plurality of the linked list entries, each state bit having (i) a first state indicating that the corresponding linked list entry is active and (ii) a second state indicating that the corresponding linked list entry is inactive, wherein at least one profile indicates, as active, a subset of entries of the linked list, wherein the subset of entries of the linked list is less than all entries of the linked list, and wherein each of the plurality of profiles contains a different combination of active linked list entries;

updating at least one of the plurality of profiles to add or remove a linked list entry by setting a state of at least one state bit; and using the plurality of profiles to identify different subsets of entries of the linked list.

7. The method of claim 6, wherein the plurality of profiles are stored in a profile table, and wherein updating the at least one of the plurality of profiles comprises:

identifying if a network device has been added to the network resources, and, if so, adding an entry to the linked list and a state bit to each of the at least one profiles, where the added entry and the added state bit correspond to a network resource for transmitting the multicast message to the added network device; and identifying if a previous network device has been removed from the network resources, and, if so, removing an entry of the linked list and a state bit from each of the at least one profiles, wherein the removed entry and the removed state bit correspond to a network resource for transmitting the multicast message to the removed network device.

8. The method of claim 6, wherein the plurality of profiles are stored within the linked list entries, and wherein updating the at least one of the plurality of profiles comprises:

identifying if a network resource is to be added to any of the plurality of profiles and setting to active the state bit for the linked list entry corresponding to the added network resource; and identifying if a network resource is be removed from any of the plurality of profiles and setting to inactive the state for the linked list entry corresponding to the removed network resource.

9. The method of claim 6, further comprising storing, in the network device, the linked list in a first data table, where each linked list entry contains a data field, a pointer field containing a pointer reference to another entry in the first data table, and a profile bitmap field comprising the state bits.

10. The method of claim 6, wherein each network resource corresponds to a different physical port on the network device, such that the linked list entries identify a plurality of the physical ports on the network device and such that the plurality of profiles identify subsets of the plurality of the physical ports on the network device.

11. A network device for transmitting a multicast message over a network, the network device comprising:

a packet processor having a linked list handler configured to access a profile defining a subset of entries of a linked list, wherein the subset of entries of the linked list is less than all entries of the linked list, where the linked list handler is configured to access the profile from among a plurality of profiles, each profile defining a different subset of entries of the linked list, where the entries of the linked list are arranged such that each entry, except for the last entry, contains a pointer to another entry in the linked list, where each entry in the linked list corresponds to a different network resource of the network device, where each network resource corresponds to a different port on the network device such that the linked list entries identify a plurality of the ports on the network device and such that the profile identifies a subset of the plurality of the sorts on the network device where each network resource is for communicating with a different network device on the network, and where the profile stores state bits corresponding to a state of each entry in the subset of entries in the linked list, the state bits identifying whether an entry of the linked list is included in the subset, wherein the linked list handler is configured to use the profile to identify the subset of entries of the linked list; and wherein the packet processor is configured to transmit the multicast message to only the network resources identified in the-subset of entries of the linked list and not to the network resources identified in other entries of the linked list.

12. The device of claim 11, wherein each network resource corresponds to a different physical port on the network device, such that the linked list entries identify a plurality of the physical ports on the network device and such that the profile identifies a subset of the plurality of the physical ports on the network device.

13. The device of claim 12, wherein the linked list handler is to access the profile by:

identifying, in a lookup table of the network device, a profile index for the profile and a linked list index for the linked list corresponding to the profile; and determining which of the linked list entries are active based on the state bits stored in the profile.

14. The device of claim 13, wherein the linked list handler is configured to update the profile to indicate the addition of a new user network device on the network or the removal of a previous network device from the network by changing a state bit in the profile.

15. The device of claim 14, wherein the linked list handler is configured to update the profile by adding to the linked list an entry corresponding to the new network device or removing from the linked list an entry corresponding to the previous network device.

16. A network device for managing a multicast group of network devices on a network, the device comprising:

a packet processor having a linked list handler configured to define a linked list having a plurality of linked list entries corresponding to network resources of the network device and to define a plurality of profiles associated with the linked list entries, where each linked list entry, except for the last entry, contains a pointer to another entry in the linked list, wherein at least one profile indicates, as active, a subset of entries of the linked list, and wherein at least one profile comprises a state bit for at least some of the plurality of the linked list entries, each state bit having (i) a first state indicating that the corresponding linked list entry is active and (ii) a second state indicating that the corresponding linked list entry is inactive, wherein the subset of entries of the linked list is less than all entries of the linked list, wherein each of the plurality of profiles contains a different combination of active linked list entries, where the linked list handler is configured to update at least one of the plurality of profiles to add or remove a linked list entry by setting a state of at least one state bit, and use the plurality of profiles to identify different subsets of entries of the linked list.

17. The device of claim 16, wherein the plurality of profiles are stored in a profile table, and wherein the linked list handler is configured to update the at least one of the plurality of profiles by:

identifying if a network device has been added to the network resources, and, if so, adding an entry to the linked list and a state bit to each of the at least one profiles, where the added entry and the added state bit correspond to a network resource for transmitting the multicast message to the added network device; and identifying if a previous network device has been removed from the network resources, and, if so, removing an entry of the linked list and a state bit from each of the at least one profiles, wherein the removed entry and the removed state bit correspond to a network resource for transmitting the multicast message to the removed network device.

18. The device of claim 16 wherein the plurality of profiles are stored within the linked list entries, and wherein the linked list handler is configured to update the at least one of the plurality of profiles by:

identifying if a network resource is to be added to any of the plurality of profiles and setting to active the state bit for the linked list entry corresponding to the added network resource; and identifying if a network resource is be removed from any of the plurality of profiles and setting to inactive the state for the linked list entry corresponding to the removed network resource.

19. The device of claim 16, wherein the linked list handler is configured to store, in the network device, the linked list in a first data table, where each linked list entry contains a data field, a pointer field containing a pointer reference to another entry in the first data table, and a profile bitmap field comprising the state bits.

20. The device of claim 16, wherein each network resource corresponds to a different physical port on the network device, such that the linked list entries identify a plurality of the physical ports on the network device and such that the plurality of profiles identify subsets of the plurality of the physical ports on the network device.

\* \* \* \* \*